(12) United States Patent
Ross

(10) Patent No.: US 8,725,648 B2
(45) Date of Patent: May 13, 2014

(54) DIGITAL RIGHTS CONTENT SERVICES ARCHITECTURE

(75) Inventor: Robert Paul Ross, Sunnyvale, CA (US)

(73) Assignee: SavoirSoft, Inc., Sunnyvale, CA (US)

( * ) Notice: Subject to any disclaimer, the term of this patent is extended or adjusted under 35 U.S.C. 154(b) by 839 days.

(21) Appl. No.: 12/716,968

(22) Filed: Mar. 3, 2010

(65) Prior Publication Data

US 2011/0055090 A1 Mar. 3, 2011

Related U.S. Application Data

(60) Provisional application No. 61/238,872, filed on Sep. 1, 2009.

(51) Int. Cl.
*G06F 21/10* (2013.01)

(52) U.S. Cl.
USPC .............................................. 705/59; 705/51

(58) Field of Classification Search
USPC .......................................................... 705/59
See application file for complete search history.

(56) References Cited

U.S. PATENT DOCUMENTS

| | | | |
|---|---|---|---|
| 5,765,152 A | 6/1998 | Erickson | |
| 6,226,618 B1 | 5/2001 | Downs et al. | |
| 6,236,971 B1 | 5/2001 | Stefik et al. | |
| 6,253,193 B1 | 6/2001 | Ginter et al. | |
| 6,370,543 B2 * | 4/2002 | Hoffert et al. | 725/113 |
| 6,834,110 B1 | 12/2004 | Marconcini et al. | |
| 7,249,107 B2 | 7/2007 | Yaacovi | |
| 7,376,623 B2 | 5/2008 | Dutta et al. | |
| 7,640,596 B1 | 12/2009 | Cho et al. | |
| 7,949,728 B2 * | 5/2011 | Rivette et al. | 709/219 |
| 2002/0007456 A1 | 1/2002 | Peinado et al. | |
| 2002/0056118 A1 | 5/2002 | Hunter et al. | |
| 2002/0120577 A1 | 8/2002 | Hans et al. | |
| 2003/0177073 A1 * | 9/2003 | Ogai | 705/26 |
| 2004/0093279 A1 | 5/2004 | Yamanoue et al. | |
| 2006/0167814 A1 * | 7/2006 | Peinado et al. | 705/59 |
| 2007/0124201 A1 * | 5/2007 | Hu et al. | 705/14 |

(Continued)

OTHER PUBLICATIONS

Thomas, T. et al., "Joint Watermarking Scheme for Multiparty Multilevel DRM Architecture," Information Forensics and Security, IEEE Transactions on, Dec. 2009, vol. 4, No. 4 part 2, pp. 758-767.

(Continued)

*Primary Examiner* — Calvin L Hewitt, II
*Assistant Examiner* — Tim Hale
(74) *Attorney, Agent, or Firm* — Blakely Sokoloff Taylor & Zafman LLP

(57) ABSTRACT

A selection of a digital content item is received from a client over a network. A license agreement associated with the selected digital content item is identified based on a content ID of the digital content item, where the license agreement is identified by a license ID. The license agreement includes one or more constraints for accessing the digital content item. A tracking code is generated based on the content ID associated with the selected digital content item, the license ID associated with the identified license agreement, and the user ID associated with the client. The tracking code is inscribed on the digital content item to generate a deliverable content file, where the deliverable content file contains the digital content item therein. The deliverable content file is transmitted to the client over the network, where the tracking code is visible or audible when the digital content item is accessed from the deliverable content file.

15 Claims, 18 Drawing Sheets

(56) References Cited

U.S. PATENT DOCUMENTS

| | | |
|---|---|---|
| 2007/0208669 A1* | 9/2007 | Rivette et al. .................. 705/59 |
| 2007/0255965 A1 | 11/2007 | McGucken |
| 2008/0114688 A1 | 5/2008 | Martinez et al. |
| 2008/0147797 A1* | 6/2008 | Ramaswamy et al. ........ 709/204 |
| 2008/0172747 A1* | 7/2008 | Hurtado et al. ................. 726/26 |
| 2008/0195573 A1* | 8/2008 | Onoda et al. ...................... 707/1 |
| 2008/0208692 A1* | 8/2008 | Garaventi et al. ............... 705/14 |
| 2008/0295182 A1* | 11/2008 | Ogai ............................... 726/29 |
| 2009/0132403 A1 | 5/2009 | Titus et al. |
| 2009/0132422 A1 | 5/2009 | Booth et al. |
| 2009/0228985 A1 | 9/2009 | Maurer |
| 2009/0328134 A1 | 12/2009 | Ray et al. |
| 2010/0008500 A1* | 1/2010 | Lisanke et al. ................. 380/201 |
| 2010/0031366 A1* | 2/2010 | Knight et al. ................... 726/26 |
| 2011/0182466 A1* | 7/2011 | Lin et al. ....................... 382/100 |

OTHER PUBLICATIONS

Koenen, R.H. et al., "The Long March to Interoperable Digital Right Management," Proceedings of the IEEE, Jun. 2004, vol. 92, No. 6, pp. 883-897.

Krueger, C. et al., "E-Business Models in the Online Music Sector—A Survey of 10 European Countries," Web Delivering of Music, 2004, WEDELMUSIC 2004, Proceedings of the Fourth International Conference on, 2004, pp. 156-165.

* cited by examiner

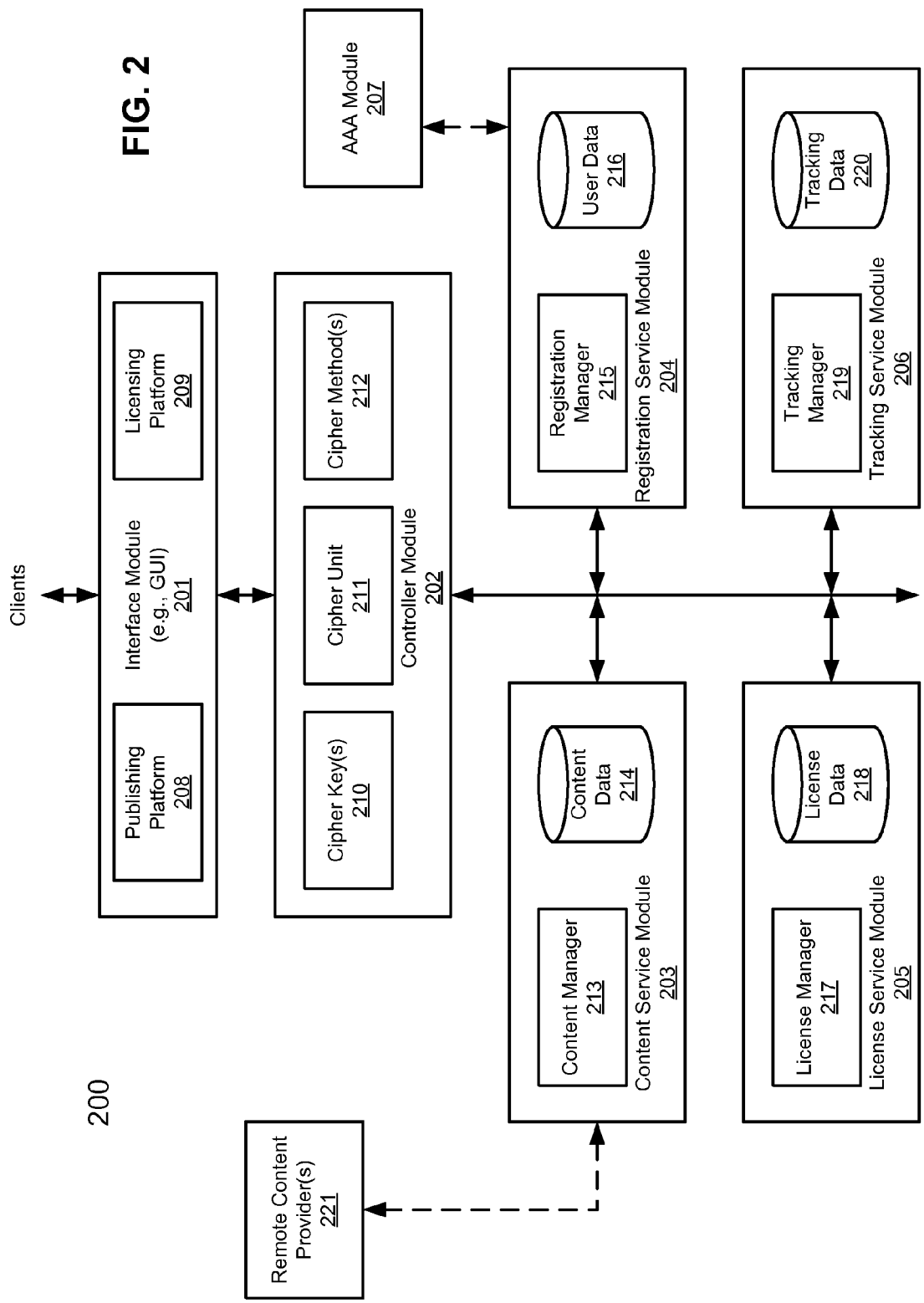

| Content ID | Content Path/Filename | License ID |
|---|---|---|
| ... | ... | ... |
| ... | ... | ... |

FIG. 3A

| License ID | License Path/Filename |
|---|---|
| ... | ... |
| ... | ... |

FIG. 3B

| User ID | User Profile Path/Filename |
|---|---|
| ... | ... |
| ... | ... |

FIG. 3C

CERTIFICATE OF AMENDMENT AND RESTATEMENT
OF
ARTICLES OF INCORPORATION
OF
████████ INTERNATIONAL, INC.
A Nevada Corporation THE UNDERSIGNED hereby certifies as follows:

1. He is the duly elected and acting Secretary of ████████ International, Inc., a Nevada corporation (the "Corporation").

2. On March 13, 2003, the Board of Directors of the Corporation unanimously approved the amendment and restatement of the Corporation's articles of incorporation (the "Articles"), pursuant to Section 78.385 of the Nevada Revised Statutes ("NRS").

3. On May 16, 2003, upon the recommendation of the Board of Directors of the Corporation, the proposed amendment to the Articles was submitted to the stockholders of the Corporation. The stockholders of the Corporation's $.01 par value Class B Voting common stock ("Class B Common Stock") were entitled to vote on the amendment, with the amendment to the Articles requiring the affirmative vote of a majority of the outstanding Class B Common Stock. The holders of a majority of Class B Common Stock voted in favor of the amendment to Article IV to add Section 4.6, requiring the Corporation to obtain stockholder approval for any sale of issuance of 5% or more of the Corporation's Class B Common Stock. The Corporation, having received the approval required for the amendment, incorporates the amended provision of the Articles in the Amended and Restated Articles of Incorporation attached hereto.

4. Article IV, Capital Stock, is hereby amended to include Section 4.6, such section to read in full as follows:

4.6 Certain Issuances of Class B Voting Common Stock. The Corporation shall not, without the approval or ratification of the holders of a majority of the outstanding shares of Class B Voting Common Stock, engage in any transaction, or series of related transactions, involving the sale, issuance or potential issuance by the Corporation of shares of Class B Voting Common Stock (or securities convertible into or exchangeable for shares of Class B Voting Common Stock) equal to 5% or more of the shares of Class B Voting Common Stock as of the date of such sale or issuance; provided, however, that this Section 4.6 shall not apply to the sale or issuance of shares of Class B Voting Common Stock pursuant to the exercise of stock options outstanding as of the date this Section 4.6 is made part of the Amended and Restated Articles of Incorporation of the Corporation.

5. The Corporation's Articles are hereby amended and restated to read in full as follows:

FIG. 7A

CERTIFICATE OF AMENDMENT AND RESTATEMENT
OF
ARTICLES OF INCORPORATION
OF
▓▓▓▓▓ INTERNATIONAL, INC.
A Nevada Corporation THE UNDERSIGNED hereby certifies as follows:

1. He is the duly elected and acting Secretary of ▓▓▓▓▓ International, Inc., a Nevada corporation (the "Corporation").

2. On March 13, 2003, the Board of Directors of the Corporation unanimously approved the amendment and restatement of the Corporation's articles of incorporation (the "Articles"), pursuant to Section 78.385 of the Nevada Revised Statutes ("NRS").

3. On May 16, 2003, upon the recommendation of the Board of Directors of the Corporation, the proposed amendment to the Articles was submitted to the stockholders of the Corporation. The stockholders of the Corporation's $.01 par value Class B Voting common stock ("Class B Common Stock") were entitled to vote on the amendment, with the amendment to the Articles requiring the affirmative vote of a majority of the outstanding Class B Common Stock. The holders of a majority of Class B Common Stock voted in favor of the amendment to Article IV to add Section 4.6, requiring the Corporation to obtain stockholder approval for any sale of issuance of 5% or more of the Corporation's Class B Common Stock. The Corporation, having received the approval required for the amendment, incorporates the amended provision of the Articles in the Amended and Restated Articles of Incorporation attached hereto.

4. Article IV, Capital Stock, is hereby amended to include Section 4.6, such section to read in full as follows:

4.6 Certain Issuances of Class B Voting Common Stock. The Corporation shall not, without the approval or ratification of the holders of a majority of the outstanding shares of Class B Voting Common Stock, engage in any transaction, or series of related transactions, involving the sale, issuance or potential issuance by the Corporation of shares of Class B Voting Common Stock (or securities convertible into or exchangeable for shares of Class B Voting Common Stock) equal to 5% or more of the shares of Class B Voting Common Stock as of the date of such sale or issuance; provided, however, that this Section 4.6 shall not apply to the sale or issuance of shares of Class B Voting Common Stock pursuant to the exercise of stock options outstanding as of the date this Section 4.6 is made part of the Amended and Restated Articles of Incorporation of the Corporation.

5. The Corporation's Articles are hereby amended and restated to read in full as follows:

FIG. 7B

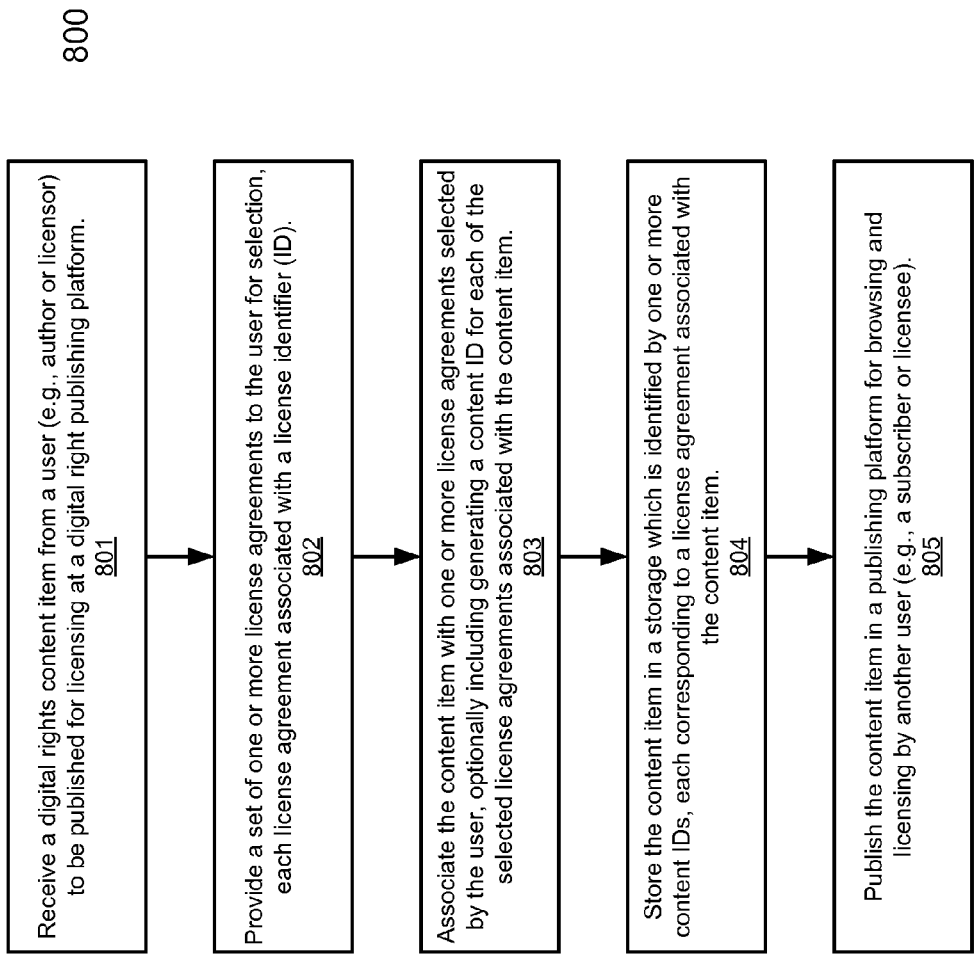

FIG. 10D savoirsoft
Enable the Extraordinary

Welcome Robert Ross | 4000 | Cart(0) | Logout

Search for knowledge, talent, and skill

| Ask | Answer | Publish | Symposiums | Forums | Find | Browse SaviorGenres | Piques | My Account |

Publish Your Work
⊕ Publish Your Work
↳ Your Publication

Publishing -- Step #4

Previous Screen

Estimated Pricing and Fees — 1041

License: Standard — 1042
Price: $1000.00 USD — 1043
Est. Publication Fees: $740.00 USD — 1044
Est. Royalties: $260.00 USD — 1045
Royalty Payment Schedule: 30 days after payment received
Min. Token Request: 1015 Tokens [0 ⬍] Add additional Tokens — 1046

Author's Acceptance and Agreement

I acknowledge and accept the above estimated publication fees, royalty payment schedule and minimum number of Tokens requested from end-users of your Work before you may publish this Work on SavoirSoft.

☐ I Agree *  — 1047

[ Post Work ] — 1048

1040

Patent Pending

© SavoirSoft, Inc. All rights reserved.    Home | Terms | Privacy | Member Services | Site Map | Contact Us

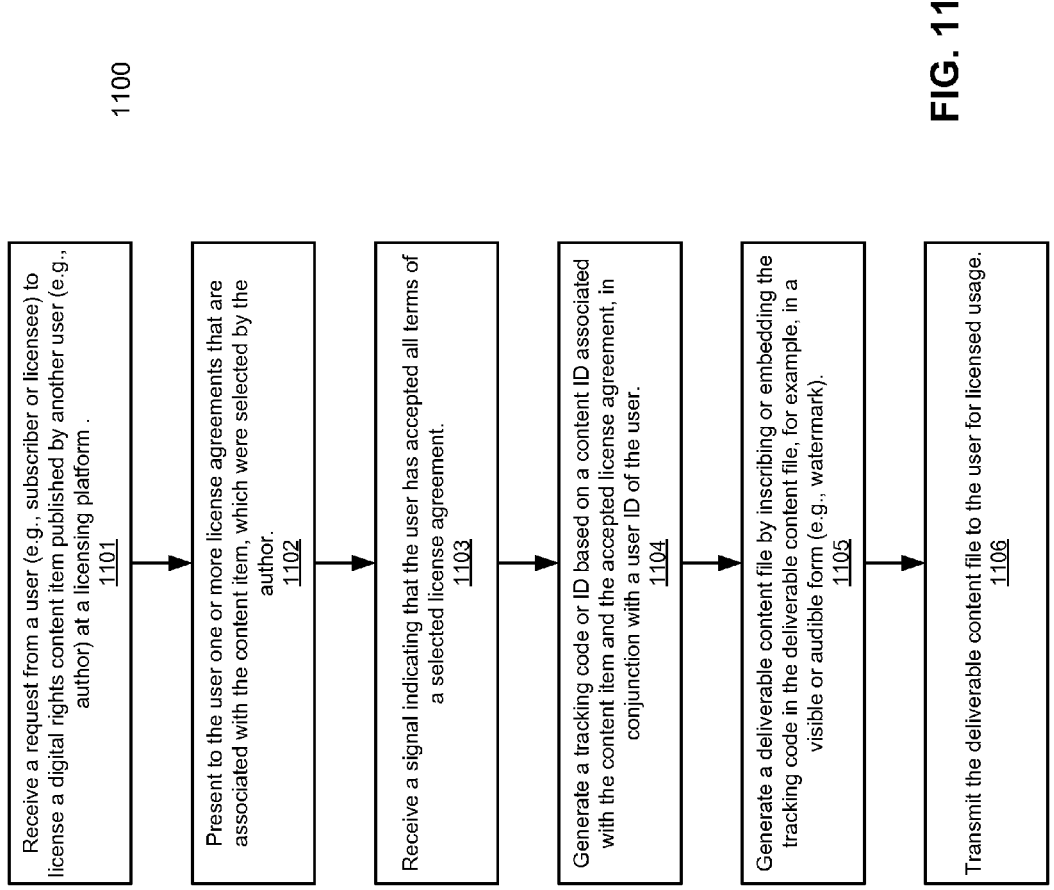

DIGITAL RIGHTS CONTENT SERVICES ARCHITECTURE

RELATED APPLICATIONS

This application claims the priority of U.S. Provisional Patent Application No. 61/238,872, entitled "Digital Intellectual Property Content Services Architecture," filed Sep. 1, 2009, which is incorporated by reference herein in its entirety.

FIELD OF THE INVENTION

Embodiments of the invention relate generally to the field of digital rights management systems; and more particularly, to a platform for publishing and subscribing digital rights content items.

BACKGROUND

Digital rights management and enforcement is highly desirable in connection with digital content such as digital audio, digital video, digital text, digital data, digital multimedia, etc., where such digital content is to be distributed to users. Typical modes of distribution include tangible devices such as a magnetic (floppy) disk, a magnetic tape, an optical (compact) disk (CD), etc., and intangible media such as an electronic bulletin board, an electronic network, the Internet, etc. Upon being received by the user, such user renders, displays, or plays the digital content.

Typically, a content owner or rights owner or rights holder, such as an author, a publisher, a broadcaster, etc. (hereinafter content owner or rights holder), wishes to distribute such digital content to a user or recipient in exchange for a license fee or some other consideration. Such content owner, given the choice, would likely wish to restrict what the user can do with such distributed digital content. For example, the content owner may want to restrict the user from copying and re-distributing such content to a second user, at least in a manner that denies the content owner a license fee from such second user.

In addition, the content owner may wish to provide the user with the flexibility to purchase different types of use licenses at different license fees, while at the same time holding the user to the terms of whatever type of license is in fact purchased. For example, the content owner may wish to allow distributed digital content to be used only a limited number of times, only for a certain total time, only on a certain type of machine, only on a certain type of media player, only by a certain type of user, etc.

Currently, owners of digital rights content have to develop their own, unique licensing and protection computer application if they wish to record and enforce distribution and usage rights for their works transferred or displayed by streaming and download services through electronic mails, the communication and connectivity networks. This development is costly in time and financial resources, and requires not only access to those with technical system competence and "know-how," but access to those who are competent in understanding the complexities of the related laws and practices. There has been a lack of user friendly and efficient platform for a user to publish and/or subscribe digital rights content.

SUMMARY OF THE DESCRIPTION

According to one aspect of the invention, a selection of a digital content item is received from a client over a network, where the client is identified by a user identifier (ID) and the digital content item is identified by a content ID. A license agreement associated with the selected digital content item is identified based on the content ID of the digital content item, where the license agreement is identified by a license ID. The license agreement includes one or more constraints for accessing the digital content item. A tracking code is generated based on the content ID associated with the selected digital content item, the license ID associated with the identified license agreement, and the user ID associated with the client. The tracking code is inscribed on the digital content item to generate a deliverable content file, where the deliverable content file contains the digital content item therein. The deliverable content file is transmitted to the client over the network, where the tracking code is visible or audible when the digital content item is accessed from the deliverable content file. The tracking code includes information indicating that the digital content item has been specifically delivered to the client.

According to another aspect of the invention, a digital content item is received from a client, where the client is identified by a user ID. One or more license agreements are presented to the client, where each license agreement is identified by a license ID. In response to a selection of a license agreement from the license agreements by the client, a content ID is generated based on the user ID and a license ID associated with the selected license agreement. The content ID is generated by ciphering the user ID, the license ID, and one or more attributes extracted from the digital content item, using a cipher key according to a predetermined cipher method. The digital content item is stored in a storage, where the digital content item is associated with and identified by the content ID. The digital content item can be browsed and licensed subsequently by another user based on the content ID.

Other features of the present invention will be apparent from the accompanying drawings and from the detailed description which follows.

BRIEF DESCRIPTION OF THE DRAWINGS

Embodiments of the invention are illustrated by way of example and not limitation in the figures of the accompanying drawings in which like references indicate similar elements.

FIG. 2 is a block diagram illustrating a content system according to one embodiment of the invention.

FIGS. 3A-3C are block diagrams illustrating examples of data structures according to certain embodiments of the invention.

FIGS. 7A-7B illustrate example of a content item with and without a tracking code inscribed thereon according to one embodiment of the invention.

FIG. 8 is a flow diagram illustrating a method for publishing a digital right content item according to one embodiment of the invention.

FIGS. 10A-10D are screenshots illustrating graphical user interfaces for publishing a digital rights content item according to certain embodiments of the invention.

FIG. 11 is a flow diagram illustrating a method for licensing a digital right content item according to one embodiment of the invention.

DETAILED DESCRIPTION

Figure 1:
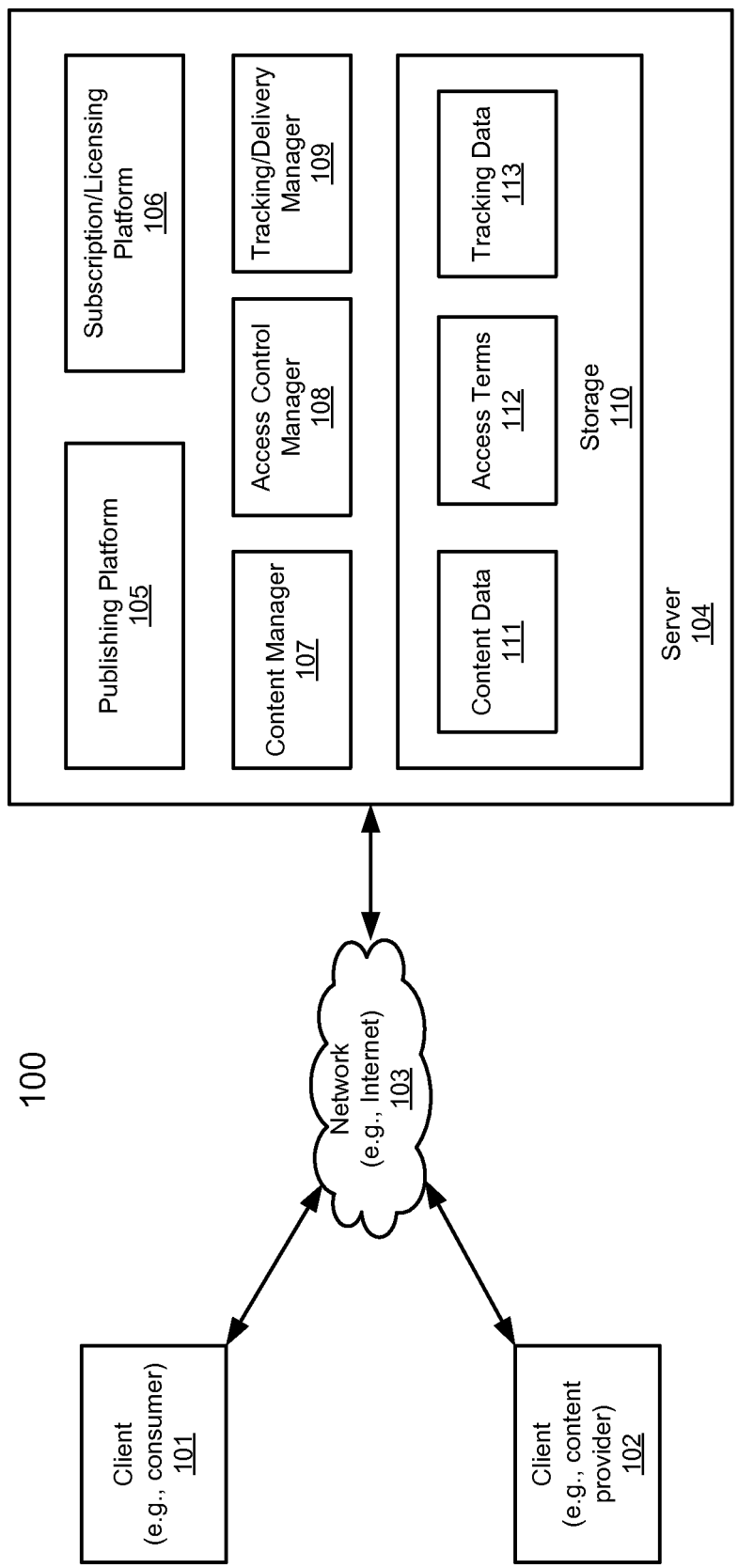
FIG. 1 is a block diagram illustrating a network configuration in which a digital rights service framework may be employed according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes or methods depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

According to some embodiments, a service framework is provided to record, search, identify, and track usage and ownership rights of copies of digital rights content items, for example, digitally encoded intellectual property works. The framework is configured to facilitate the digital rights content licensing that allows rights owners or holders and rights users to digitally register and accept respectively the licensing terms and conditions of the content, and to assign and track the licensed content items to specific rights owners and users of such protected and licensed content items.

Digital rights content referred herein can be a digitally encoded file of information, knowledge or technology, which may be incorporated in tangible objects, and at the same time, be distributed digitally in an unlimited number of copies where the digital rights content is not only embodied in those copies but also in the information, knowledge, or technology reflected in them as well. Digital rights content may include literacy, artistic and scientific works; performances of performing artists, phonograms, and broadcasts; inventions in all fields of human endeavor; scientific discoveries; computer programs; industrial designs; trademarks, service marks, and commercial names and designations; and all other intellectual activities in the industrial, scientific, literary, or artistic fields.

Embodiments of the invention provide a service framework that records, searches for, identifies, and tracks usage and ownership rights of copies of digitally encoded digital rights works that have been rendered. One of the purposes supposes a system architecture to facilitate the intellectual property licensing of digitally encoded I.P. Works, and suggests a new intellectual property content service framework to support the electronic recording, searching, distribution, and display of digital rights works that allow rights owners and rights users to digitally register and accept, respectively, the licensing terms and conditions of digital rights works, and assign and track the licensed digital rights works to specific rights owners and users of such protected and licensed digital rights works.

In one embodiment, digital rights content service architecture (also referred to as intellectual property or I.P. Framework) may reside on a computer, whether it is a part of the operating system ("OS"), an application, or integrated within other applications. Computer applications, tools, or other software utilities may use an application program interface ("API") to automate the management, searching, and tracking of intellectual property rights and digital rights works (also referred to as I.P. Works) including the granting of derivative rights and the controlled access to and tracking of the resulting I.P. Works' derivatives. The I.P. Framework may host several components for searching, receiving and processing I.P. Content Data (e.g. a digitally encoded file of intellectual property (I.P. Work) and I.P. rights data, such as I.P. rights owner and rights user information, I.P. licensing terms and conditions, and/or I.P. revenue and royalty arrangements, etc.); refining the I.P. Content Data, requesting I.P. Works from an I.P. content supplier for receiving and/or delivering I.P. Content Data to a delivery and display client for presentation or storing, and for providing data back to the I.P. content supplier. These I.P. Framework components may reside collectively on a single computer or be individually or in some combination distributed across multiple computers.

An application, such as a word processor, computer aided design ("CAD") program, or email client; may serve as both a source of I.P. Content Data and as a delivery and display client. Stipulations may be made by the application hosting the delivery and display client with respect to the nature of acceptable I.P. Work and other I.P. Content Data, restrictions on use of alternate delivery and display clients, as well as, specifying supported media.

The I.P. Framework may also maintain rules for revenue and royalty sharing and perform allocation of I.P. licensing revenue and royalties among contracted parties; for example, the rights owner of the I.P. Work, the owner of the application supplying the I.P. Content Data, the owner of the I.P. delivery and display client (e.g., rendering device), and the owner of the I.P. Framework. The I.P. Framework enables hosted components, whether they are part of the operating system ("OS"), an application, or integrated within other applications to address:

I.P. content data availability by collecting, retaining, and accessing I.P transaction
    information;
    Legal sufficiency of I.P. transactions to ensure validity and enforceability of
    electronic records;
    Legal admissibility requirements of I.P. transactions;
    Legal compliance of I.P. transactions such as those governing privacy, confidentiality, record keeping, and accessibility to persons with disabilities.

A computer application embodiment using the digital rights content service architecture would be able to provide the same information as the paper system: who submitted the information; what information was submitted; when the information was submitted; and whether all the relevant information was retrieved; while overcoming the paper system's other weaknesses. For example, electronic records, when properly organized or archived, are easier to store, search, and retrieve than paper and allow for much broader access than paper documents. Such electronic records may be maintained in a way that uses identifiers to associate the documents with a particular matter or "file," which often allows for easier access. Throughout this application, an electronic document is used as an example of a digital rights content item; however, other types of content may also be applied.

Digital rights content is also referred to as digital rights management (DRM) content, where DRM is a generic term for access control technologies that can be used by hardware manufacturers, publishers, copyright holders and individuals to try to impose limitations on the usage of digital content and devices. It is also, sometimes, disparagingly described as Digital Restrictions Management. The term is used to describe any technology which inhibits uses (legitimate or otherwise) of digital content that were not desired or foreseen by the content provider. It can also refer to restrictions associated with specific instances of digital works or devices.

FIG. 1 is a block diagram illustrating a network configuration in which a digital rights service framework may be employed according to one embodiment of the invention. Referring to FIG. 1, network configuration 100 includes, but not limited to, one or more clients communicatively coupled over network 103 to a content server 104 having a digital rights service framework. Network 103 may be a local area network (LAN), a wide area network (WAN), and/or a combination of thereof, wired and/or wireless. Clients 101-102 can be any computer system or computing device in communication with server 104 for publishing and/or subscribing/licensing digital rights content items or works.

In one embodiment, server 104 includes a publishing platform 105 and a subscription or licensing platform 106. Publishing platform 105 includes a set of interfaces such as graphical user interfaces (GUIs) and/or application programming interfaces (APIs) to allow a digital rights owner (also referred to as an author, rights holder, content owner, licensor, content provider or supplier, etc.) as a client to register and publish a digital rights content item, which is accessible by a content consumer (also referred to as a subscriber, licensee, rights user, etc.) to purchase or license for usage. Licensing platform 106 includes a set of interfaces such as GUIs and/or APIs to allow a consumer to purchase or license a digital rights content item published by a content owner.

In addition, server 104 includes content manager 107, access control manager 108, and tracking and delivery manager 109. Content manager 107 is configured to manage digital rights content items 111 stored in storage device 110. Access control manager 108 is configured to manage access terms 112 such as license agreements stored in storage device 110. Tracking and delivery manager 109 is configured to deliver and track a digitally encoded digital rights content item to a user, which may be tracked via a tracking code as part of tracking data 113 stored in storage device 110. Storage device 110 may be configured as a local storage, a remote storage over a network, or a combination of both.

In one embodiment, when a content owner (e.g., client 102) wishes to publish a digital right content item, the content owner can access, via publishing platform 105, server 104 and provide the digital rights content item. In response, access control manager 108 is configured to associate one or more access terms obtained from access terms 112 stored in storage device 110 with the content item. For example, one or more access terms may be presented to the content owner via publishing platform 105. The content owner may select one or more of the access terms presented to be associated with the digital rights content item. The content item may then be stored as part of content data 111 in storage 110, including relationship information with the associated access terms. An access term may spell out one or more constraints concerning how the content item is used.

Subsequently, according to one embodiment, when a user (e.g., client 101) wishes to purchase or license a digital rights content item (hereafter simply referred to as a content item), the user can access, via subscription/licensing platform 106 to browse and select a particular digital rights content item. In response, content manager 107 retrieves the content item and access control manager 108 retrieves one or more access terms associated with the selected content item. The content item and the associated access terms are presented to the user. In order to license the content item, the user has to select one of the access terms presented and expressly accept the selected access term. Note that the same content item can be associated with one or more access terms (e.g., license agreements).

In response to the acceptance of the access term, tracking and delivery manager 109 is configured to generate a tracking code and to inscribe or embed the tracking code (also referred to as a tracking identifier or ID) with the content item to generate a deliverable content file. The deliverable content file is then delivered to the user. The tracking code can be stored as part of tracking data 113 in storage 110. In one embodiment, the tracking code is inscribed on the content item in a visible or audible form, such that on its face, any user can identify that the content item is subject to a user or license agreement.

Note that components as shown in FIG. 1 are described for illustration purposes only; more or fewer components may be utilized. In addition, certain components or modules may be implemented as a single component or module or alternatively, in multiple components or modules in a distributed manner. Similarly, data stored in storage may be stored in a single database or multiple databases. Some of all of the components as shown in FIG. 1 may be implemented in software, firmware, hardware, or a combination thereof.

FIG. 2 is a block diagram illustrating a content system according to one embodiment of the invention. For example, system 200 may be implemented as part of server 104 of FIG. 1. Referring to FIG. 2, system 200 includes, but not limited to, interface module 201, controller module 202, content service module 203, registration service module 204 (also referred to as a rights service module), license service module 205, and tracking service module 206. These service modules may be communicatively coupled to each other via a bus, an interconnect, or over a network connection. For example, service modules 203-206 may be maintained or executed within system 200. Alternatively, any of service modules 203-206 may be "out sourced" to a third party remotely over a network, where any of service modules 203-206 may operate as a service proxy to a remote service facility.

In one embodiment, interface module 201 includes publishing platform 208 and licensing platform 209 to allow a user to publish and license a digital rights content item respectively. Interface module 201 may provide a Web interface, an API, or a network connection to clients for accessing system 200. Controller module 202 (also referred to as a legal consideration manager) includes a cipher unit 211, one or more cipher keys 210, and one or more ciphering methods 212 (e.g., tabula recta) for generating a variety of IDs or codes for a variety of purposes. Controller module 202 may be designed to control and coordinate operations among services modules 203-206.

In one embodiment, content service module 203 includes a content manager 213 for managing digital rights content items stored in content database 214. Content service module is also responsible to communicate with one or more remote content providers 221 over a network for managing digital rights content items stored remotely. For example, when a search request is received for searching one or more search terms, content manager 213 is configured to search content items stored locally in database 214 and content items stored remotely at remote location 221. Content manager 213 may maintain a data structure similar to the one as shown in FIG. 3A, which may also be stored in database 214. Note that, referring to FIG. 3A, for each content item, a path and filename may be a local file directory or alternatively, a link to a remote storage location (e.g., universal resource locator or URL, or universal resource indicator or URI).

In one embodiment, registration service module 204 (also referred to as a rights service module) includes a registration manager 215 (also referred to as a rights manager) for managing user data of registered users (e.g., content owners and/or consumers) stored in user database 216. Registration service module 204 may also be implemented in communication with or as a part of authentication, authorization, and accounting (AAA) module 207 for authenticating and accounting (e.g., payments of license fees, revenue sharing, etc.) of the users. AAA module 207 may be maintained locally or remotely (e.g., via a remote authentication dial-in user service or RADIUS server).

In one embodiment, license service module 205 includes a license manager 217 for managing license agreements (also simply referred to as licenses) stored in license database 218, where each license agreement is assigned with a license ID that uniquely identifies the respective license agreement. The licenses may be standard license agreements previously configured by an administrator of system 200 or customized licenses specified and received from a content owner. License manager 217 may also provide a template of a license to a content owner to dynamically create a license agreement, for example, via publishing platform 208. An example of a data structure used in license database 218 is shown in FIG. 3B. Tracking service module 206 includes a tracking manager 219 for managing tracking codes stored in tracking database 220. For each content item to be delivered to a content consumer, a tracking code is generated and inscribed on the content item in a visible or audible form, for example, as shown in FIG. 10B.

According to one embodiment, in order to publish or license a digital rights content item, a user has to register with system 200 and become a member. When a user registers via interface module 201, controller module invokes a service from registration service module 204 to collect certain user data and to create a user profile for the new user. For example, username, password, address, birthday, etc. may be collected and stored in a corresponding user profile in user database 216 in a secured manner. A user may also specify or register one or more specific devices that are preferred to receive and/or capable of rendering certain types of digital rights content items, as well as communications methods (e.g., Internet protocol or IP addresses and communications protocols) to be used with the devices. Similarly, a user who wishes to publish a content item may also specify types of devices or communications protocols that are required to receive the published content item.

Figure 4:
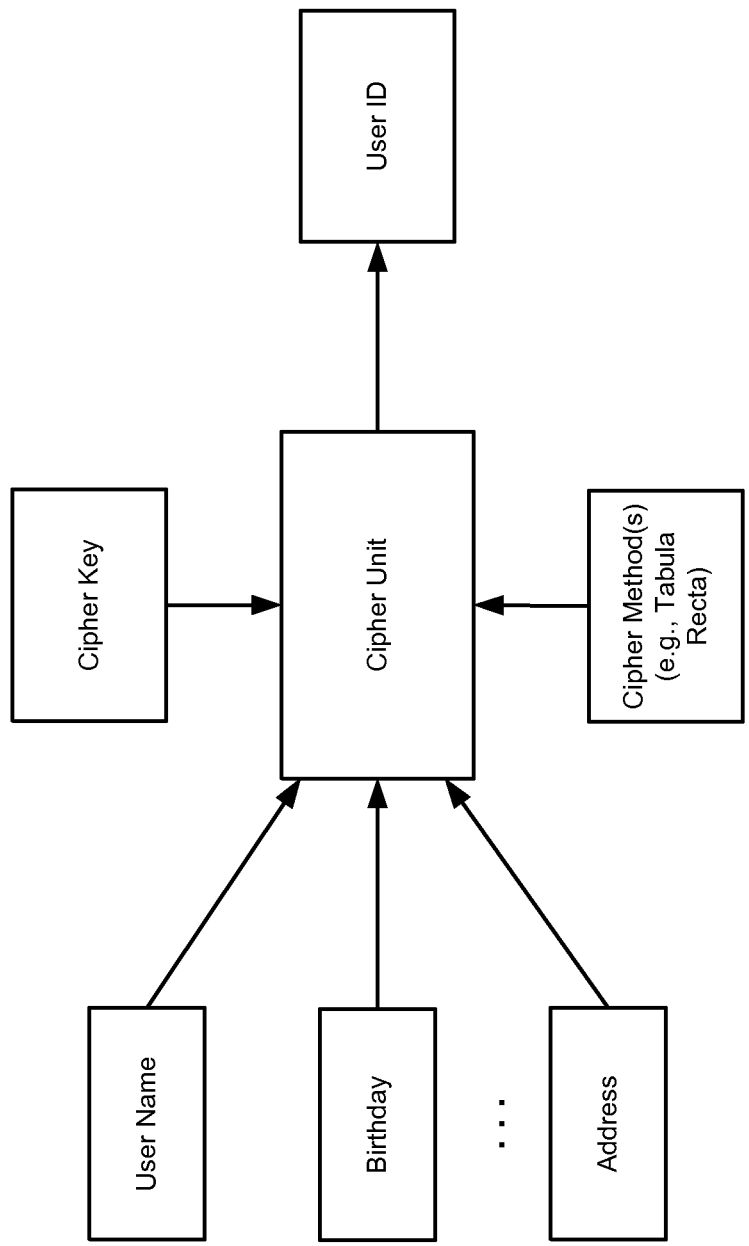
FIG. 4 is a block diagram illustrating a mechanism for generating a user identifier according to one embodiment of the invention.

In addition, controller module 202 and/or registration manager 215 may generate a user ID for the new user using cipher unit 211, a cipher key from cipher keys 210, and a cipher method from cipher methods 212. In one embodiment, a user ID is generated based on a username, birthday, and address of the corresponding user. For example, according to a particular embodiment, a username, birthday, address, and optional date and/or time at the point in time are ciphered with one or more cipher keys by a cipher unit in conjunction with a cipher method (e.g., tabula recta), for example, as shown in FIG. 4.

In cryptography, a cipher is an algorithm for performing encryption or decryption—a series of well-defined steps that can be followed as a procedure. The operation of a cipher usually depends on a piece of auxiliary information, called a key. The encrypting procedure is varied depending on the key, which changes the detailed operation of the algorithm. A key has to be selected before using a cipher to encrypt data. Without knowledge of the key, it should be difficult, if not nearly impossible, to decrypt the resulting cipher text into readable plaintext. A cipher method or algorithm can be a symmetric key algorithm (e.g., private-key cryptography), where the same key is used for encryption and decryption or alternatively, it can be an asymmetric key algorithm (e.g., public-key algorithm), where two different keys are used for encryption and decryption.

In one embodiment, the cipher operations are performed based on a tabula recta data structure. A tabula recta data structure is a square table of alphabets, each row of which is made by shifting the previous one to the left. In order to encrypt a plaintext, one locates the row with the first letter to be encrypted, and the column with the first letter of the key. The letter where the line and column cross is the ciphertext letter.

A user ID is used by system 200 to uniquely identify a particular user, who may be a content provider, a content consumer, or both. A user ID may also be used to generate other IDs or codes, for example, for tracking purposes, etc. An example of a data structure used in user database 216 is shown in FIG. 3C. To decipher a user ID, one has to know the cipher key, date or time the cipher key was applied, and the cipher method used to generate the user ID. Such information may be maintained by registration manager 215 and stored in database 216 for deciphering purposes.

After becoming a member, a user can publish a content item via publishing platform 208 by submitting the content item. In response, controller module 202 invokes a service from license service module 205 to present one or more license agreements to the user, where the license agreement may be retrieved from license database 218. The user can then select one or more license agreements to be associated with the content item. For each of the selected license agreements, a service from content service module 202 is invoked to generate a content ID representing the content item associated with a specific selected license agreement. In one embodiment, controller module 202 and/or content manager 213 may generate a content ID using cipher unit 211, a cipher key from cipher keys 210, and a cipher method from cipher methods 212. Note that multiple content IDs may be generated for the same content item under multiple license agreements (e.g., content/license pairs).

In addition, the user may also specify the license fee required to license the respective content item. The license fee may be the same or different for different license agreements associated with the content item. Further, system 200 may also suggest a license fee in a current market condition for references using a predetermined algorithm, for example, in view of content items published by other users and traffic of content consumers via the system. System 200 may also provide a rating of the content item representing a potential market value of the content item based on a variety of factors. Thereafter, the content item is stored in content database 214 or remote location 221 and the content item is published under the corresponding content ID associated with a specific license agreement.

Figure 5:
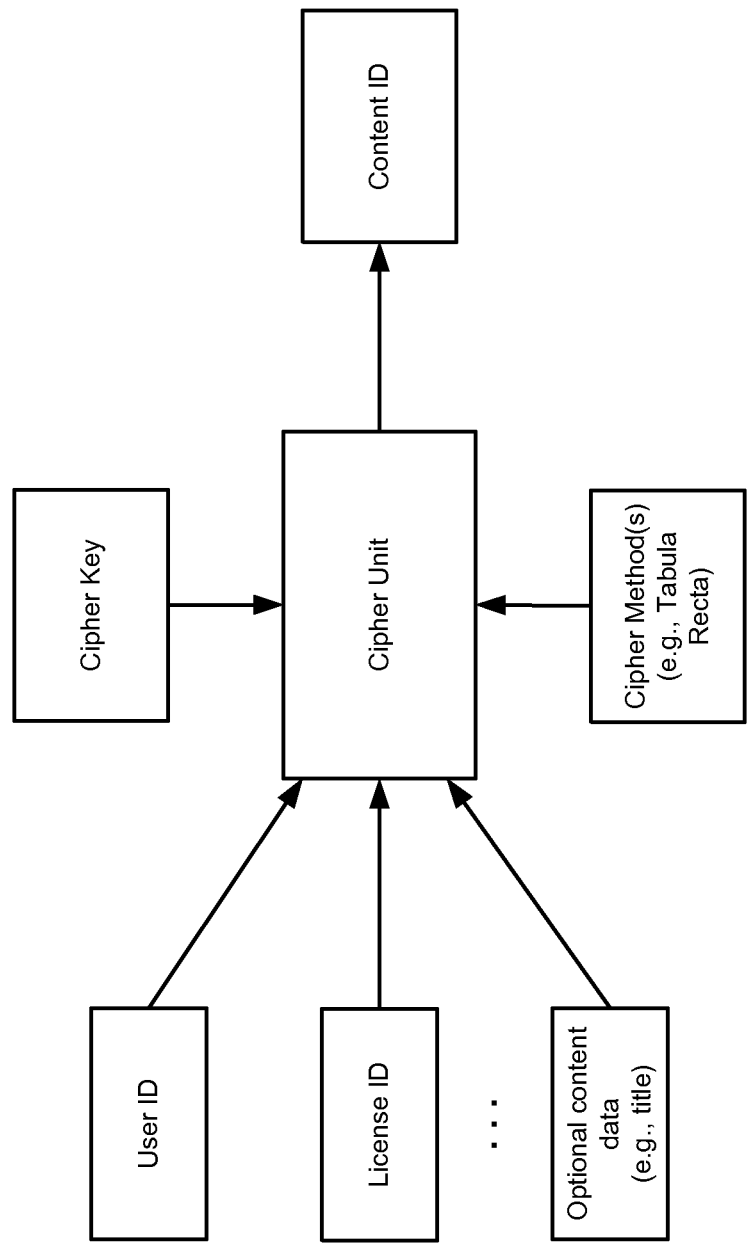
FIG. 5 is a block diagram illustrating a mechanism for generating a content identifier according to one embodiment of the invention.

In one embodiment, a content ID may be generated based on a user ID associated with the content owner, a license ID of a license agreement associated with the content item, optionally certain data (e.g., title) extracted from the associated content item, and optional date and/or time of the publication, for example, as shown in FIG. 5. In order to decipher a content ID, one has to know the cipher key, the data/time cipher key was applied, the cipher method, and the license associated with the content item. Such information may be maintained by content manager 213 and stored in database 214 for deciphering purposes.

Once a content item has been published, another user (e.g., content consumer) can browse and search for a specific content item via licensing platform 209. For example, a user can enter via a GUI page one or more terms for searching content items published by system 200. In response, controller module 202 invokes a service from content service module 203 in which content manager 213 is configured to search, based on the search terms, content items stored locally in database 214 and/or remotely in storage location 221. Once the content item or items are found, the items are presented to the user, together with one or more license agreements associated with each content item.

Via the licensing platform, the user can browse or select each content item and its associated license agreement. Again, a single content item may be listed as multiple items, each under a different license agreement and identified by a unique content ID. In order to license a content item, a user has to accept all terms (e.g., general or specific terms and conditions) of the associated license agreement. Once the user accepts all terms of the license agreement, controller module 202 invokes a service from tracking service module 206 in which tracking manager 219 is configured to generate a tracking code (also referred to as a tracking ID) to be inscribed on or embedded within the content item being licensed, generating a deliverable content file. The tracking code can be stored in tracking database 220.

Figure 6:
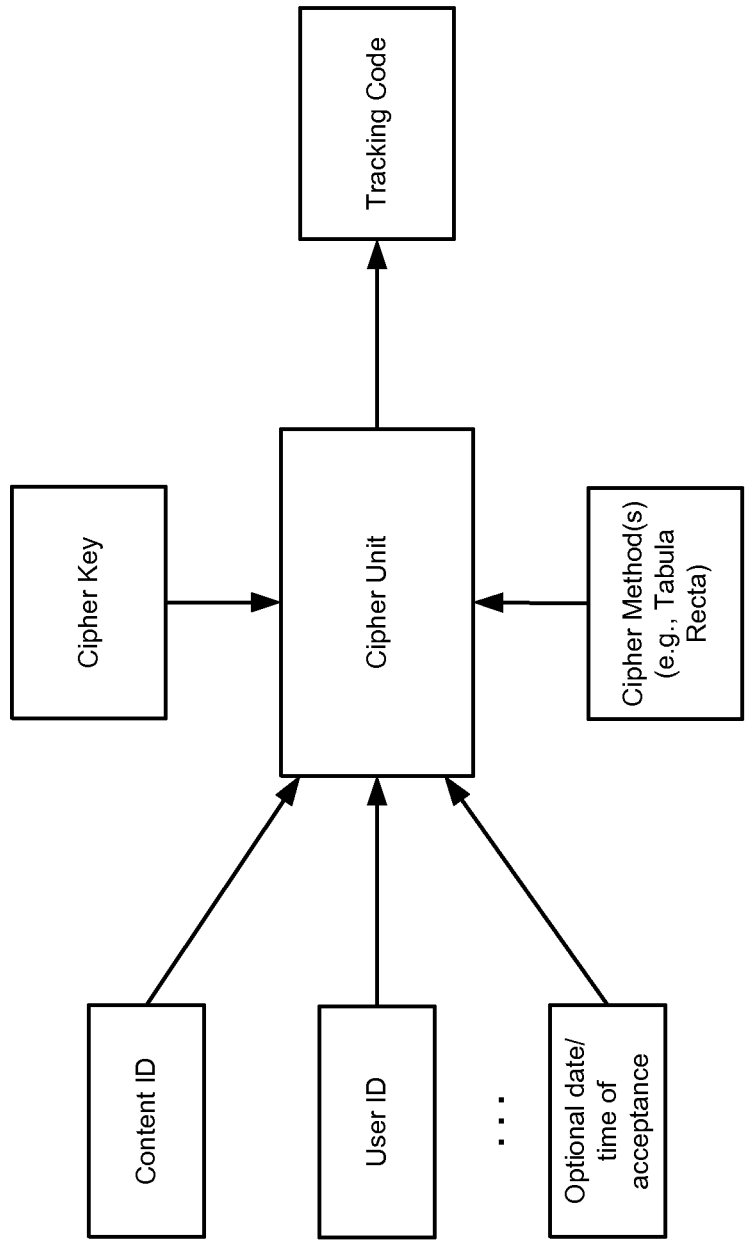
FIG. 6 is a block diagram illustrating a mechanism for generating a tracking code according to one embodiment of the invention.

In one embodiment, a tracking code is generated based on a content ID of a content item being licensed, a user ID who licenses the content item, and optional date/time of the acceptance of the license, for example, as shown in FIG. 6. In one embodiment, controller module 202 and/or tracking manager 219 may generate a tracking code using cipher unit 211, a cipher key from cipher keys 210, and a cipher method from cipher methods 212. In order to decipher a tracking code, one has to know the cipher key, date/time of the acceptance of the license, cipher method, and optional the structure of the tracking code.

In one embodiment, a tracking code is inscribed on or embedded within the content item which forms a deliverable content file. The tracking code may be visible or audible to a user who possesses the deliverable content file. The tracking code may further indicate that the corresponding content item has been licensed (e.g., exclusively) to a specific user to deter unlicensed usage. For example, when a content item as shown in FIG. 7A is licensed by a user, a tracking code is generated using the techniques set forth above. The tracking code may be inscribed as an invisible and/or visible watermark (e.g., digital watermark) on the content item as shown in FIG. 7B.

A process of inscribing digital watermarks is referred to as digital watermarking, which is the process of embedding information into a digital signal in a way that is difficult to remove. The signal may be audio, pictures or video, for example. If the signal is copied, then the information is also carried in the copy. A signal may carry several different watermarks at the same time. In visible watermarking, the information is visible in the picture or video. Typically, the information is text or a logo which identifies the owner of the media. In invisible watermarking, information is added as digital data to audio, picture or video, but it cannot be perceived as such (although it may be possible to detect that some amount of information is hidden). The watermark may be intended for widespread use and is thus made easy to retrieve, where a party communicates a secret message embedded in the digital signal. As in visible watermarking, the objective is to attach ownership or other descriptive information to the signal in a way that is difficult to remove. It is also possible to use hidden embedded information as a means of covert communication between individuals.

One application of watermarking is in copyright protection systems, which are intended to prevent or deter unauthorized copying of digital media. In this use a copy device retrieves the watermark from the signal before making a copy; the device makes a decision to copy or not depending on the contents of the watermark. Another application is in source tracing. A watermark is embedded into a digital signal at each point of distribution. If a copy of the work is found later, then the watermark can be retrieved from the copy and the source of the distribution is known.

In one embodiment, the tracking code may also be inscribed at other places, such as a footnote and/or header area of a licensed document. The tracking code may further identify a user (e.g., showing at least a name of the user in plaintext), a geographical location in which the content item should be used, and/or a particular type of devices that should be used to render the content item, etc.

Note that modules as shown in FIG. 2 are described for purposes of illustration only; more or fewer modules may also be implemented. In addition, the structure of system 200 may also be described for purposes of illustration only; other structure may also be applied. For example, modules 201-206 may be coupled to each other in a flat architecture, as any one of the modules 201-206 can directly or indirectly communicate with another module. Further, certain IDs or codes may be generated dynamically, statically, or both. For example, a content ID may be generated at the time of an acceptance of a license to license the content item. In this scenario, all content items may be published under their respective file handlers (e.g., file directory) and their associated license agreements. When a user wishes to license a particular content item by selecting a license agreement, a content ID is then generated at the point in time based on the user ID and the license ID of the selected license, as well as certain data extracted from the content item (e.g., title), and a tracking code is generated based on the content ID. Further, a content ID, user ID, and/or tracking code, may be generated using the same or different cipher key, cipher unit, and/or cipher methods. Other configurations may also exist.

FIG. 8 is a flow diagram illustrating a method for publishing a digital rights content item according to one embodiment of the invention. Note that method 800 may be performed by processing logic which may include software, firmware, hardware, or a combination thereof. For example, method 800 may be performed by system 200 of FIG. 2. Referring to FIG. 8, at block 801, a digital rights content item is received from a user (e.g., author or content owner) to be published for licensing at a digital rights publishing platform. At block 802, a set of one or more license agreements is provided to the user for selection, where each license agreement is associated with a unique license ID. In response to a selection of one or more license agreements, at block 803, the content item is associated with the selected one or more license agreements. In one embodiment, for each selected license agreement, a content ID is generated based on at least in part of the associated selected license agreement. At block 804, the content item is stored in a storage which is identified by one or more content IDs, each corresponding to an associated license agreement. At block 806, the content item is then published for browsing and licensing by another user (e.g., a subscriber or licensee).

Figure 9:
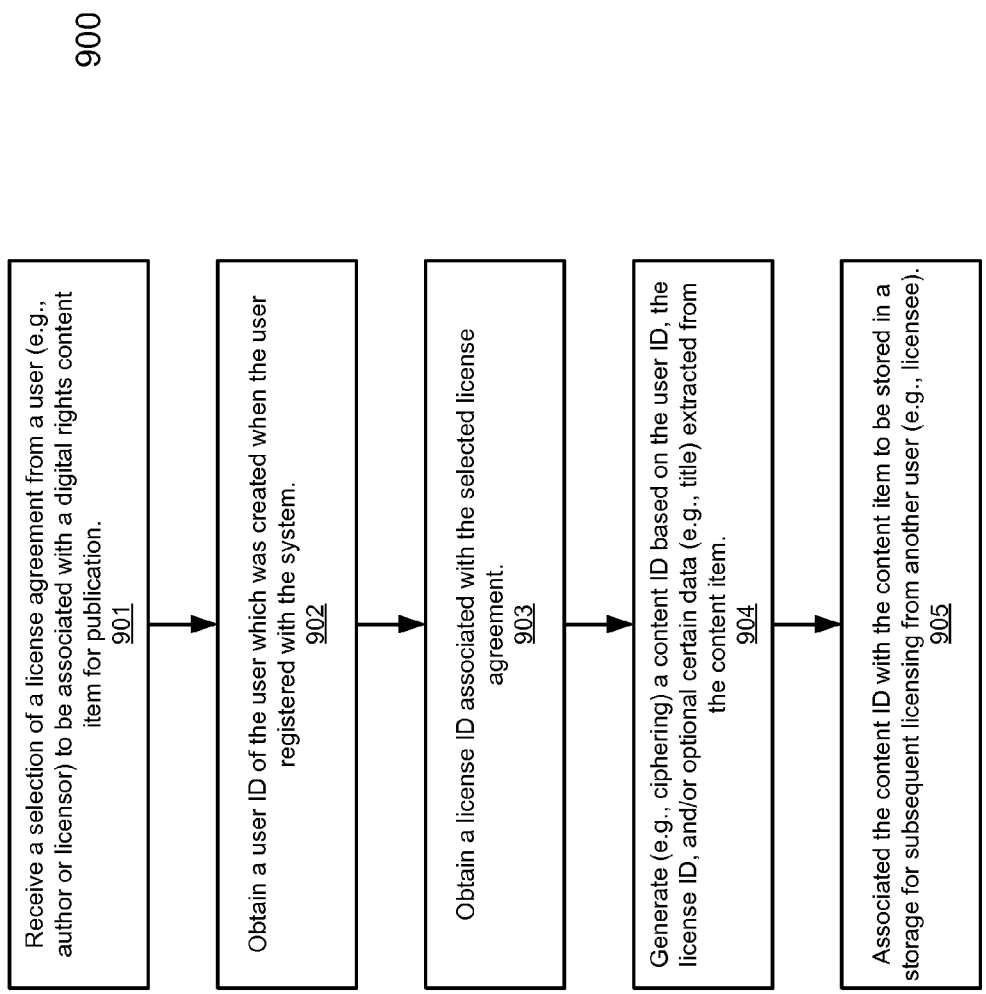
FIG. 9 is a flow diagram illustrating a method for publishing a digital right content item according to another embodiment of the invention.

FIG. 9, is a flow diagram illustrating a method for generating a content ID according to one embodiment of the invention. For example, method 900 may be performed by processing logic as part of operations involved in block 803 of FIG. 8. Referring to FIG. 9, at block 901, a selection of a license agreement is received from a user (e.g., author or content owner) to be associated with a digital rights content item for publication. In response, at block 902, a user ID associated with the user is obtained, for example, via a registration service module, where the user ID was generated when the user registered with the system. At block 903, a license ID associated with the selected license agreement is obtained, for example, via a license service module. At block 904, a content ID is generated based in part on the user ID, the license ID, and optional certain data (e.g., title, directory path/filename) extracted from the content item. At block 905, the content ID is associated with the content item which is stored in storage for publication.

Figure 10A:
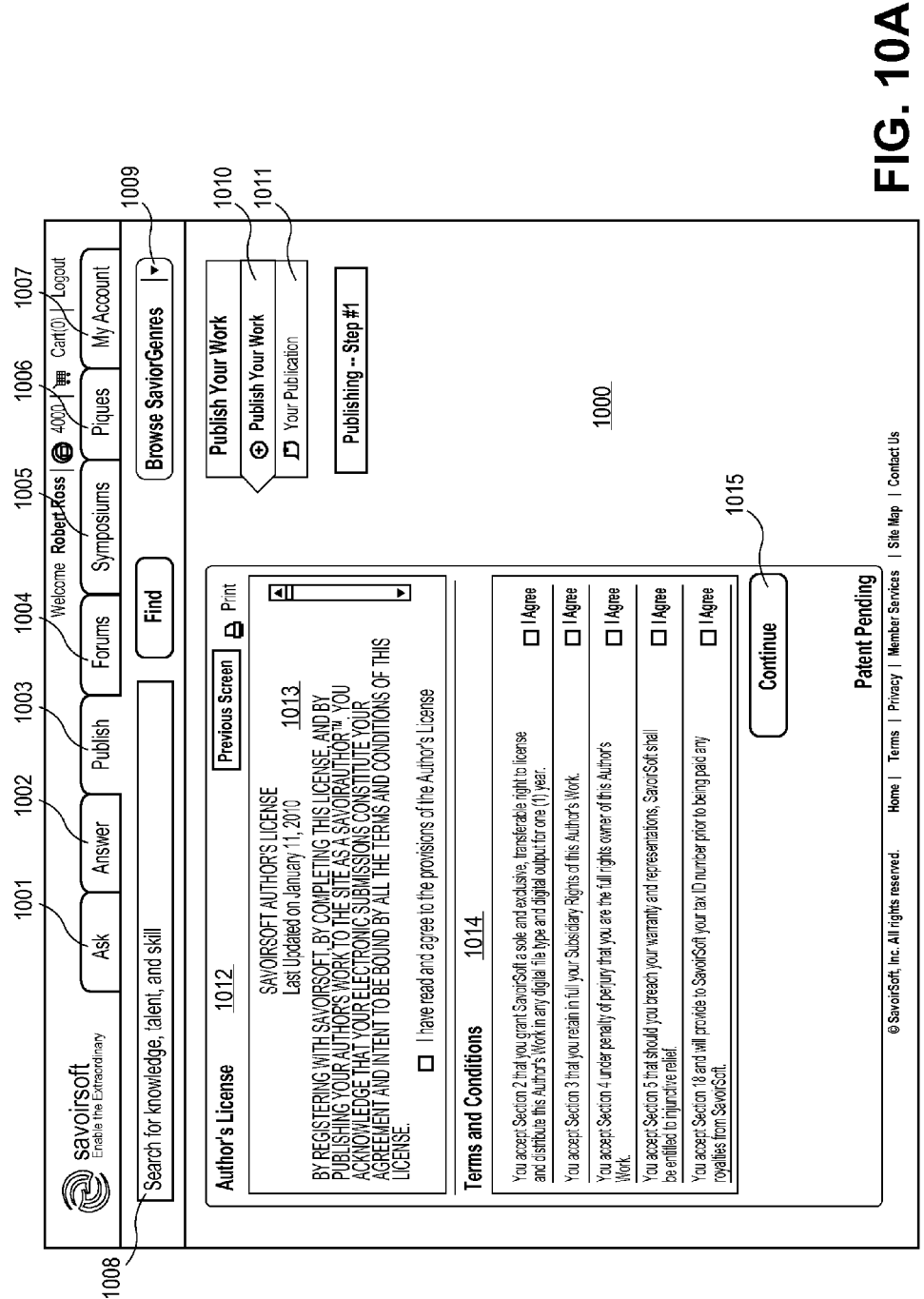
Figure 10B:
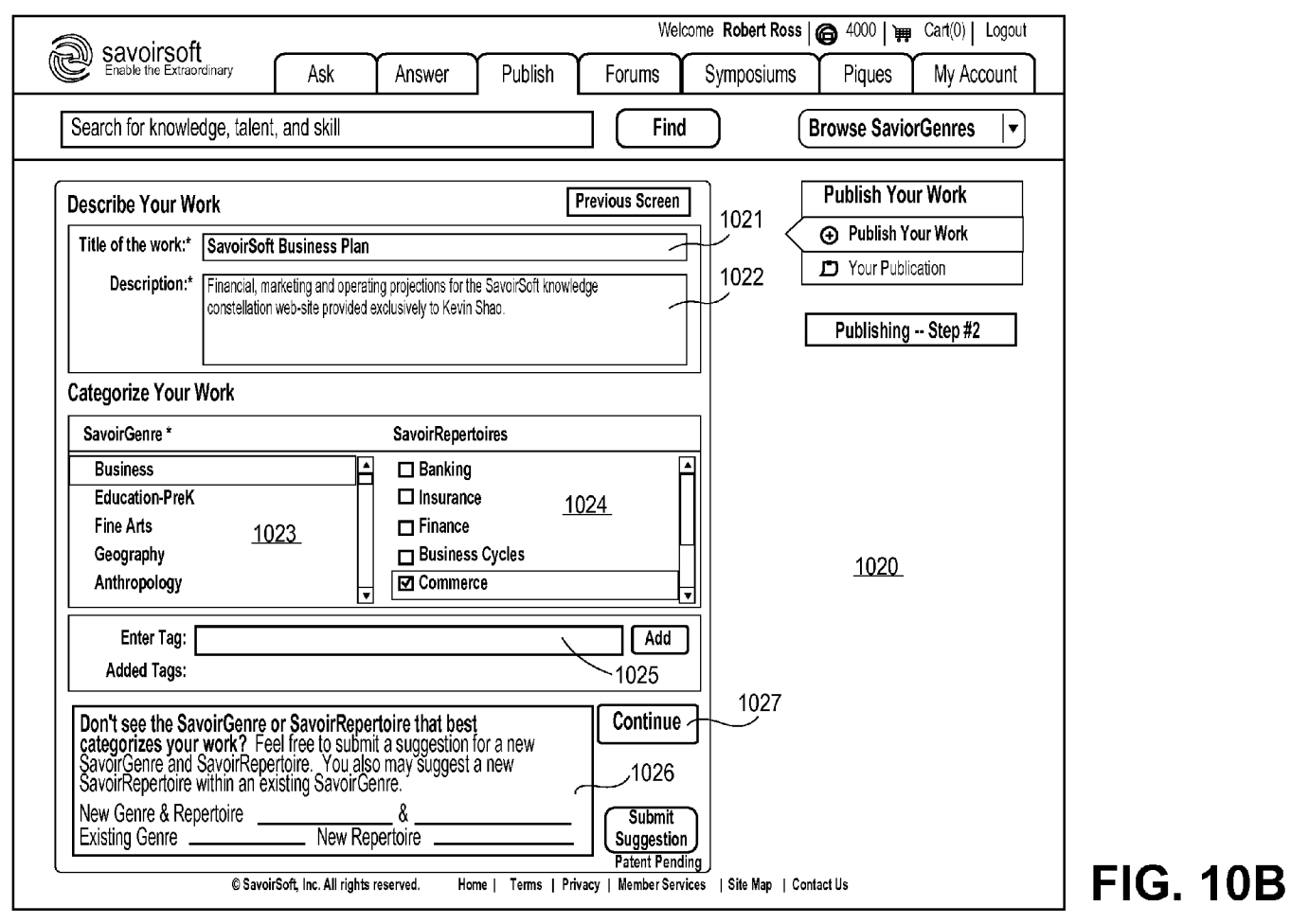

FIGS. 10A-10E are screenshots illustrating GUIs for publishing a digital rights content item according to one embodiment of the invention. For example, GUIs as shown in FIGS. 10A-10E may be presented by system 200 of FIG. 2, for example, after a user logs in as a member in the system. Referring to FIG. 10A, GUI 1000 includes multiple tabs 1001-1007 (e.g., page selectors) for variety of functions. For example, ask tab 1001 can be used to post a variety of questions to be answered by certain people (e.g., administrators or other users), where the answers can be obtained via answer tab 1002. Publish tab 1003 can be used to publish a digital rights content item while forums tab 1004 can be used to search and browse published items for purchase or license. The symposium tab 1005 can be used to view and participate in discussions of questions, answers, and publications. The piques tab 1006 is used to search for previously asked and answered questions. Note that a user can be a content owner who can publish a digital rights content item, as well as a subscriber or licensee who can purchase or license a content item.

In this example, it is assumed that a user attempts to publish a digital rights content item via publish tab 1003. In one embodiment, GUI 1000 includes a search field 1008 that can be used to enter one or more search terms for searching other content items currently published at the system. In addition, the user can also specify the scope of the search via field 1009, which can be used to limit the searching scope (e.g., genres or other categories) within which a search is to be conducted.

GUI 1000 further includes button or control 1010 to publish a new content item and button 1011 to view content items that are currently published by the user. When the user activates or clicks button 1010, an author license agreement 1012 may be displayed, where the user has to agree to all terms of the license agreement in order to publish a content item. In one embodiment, author license agreement includes a general term 1013 and one or more specific terms and conditions 1014, where each term and condition has to be expressly accepted by checking the corresponding boxes before moving forward by activating button 1015; otherwise, the same GUI page may be redisplayed or alternatively, an error message may be displayed.

Referring to FIG. 10B, GUI 1020 may be displayed in response to an activation of button 1015 of FIG. 10A, after the user accepts all terms and conditions (e.g., access terms) of the author license agreement. GUI 1020 provides a user interface to collect information regarding the content item to be published from the content owner. In one embodiment, GUI 1020 includes field 1021 to allow the user to specify a title of the content item and field 1022 to allow the user to provide a short description about the content item. This information may be used for subsequently searching and browsing by another user. In addition, the user may also specify one or more categories under which the content item is published. For example, GUI 1020 includes field 1023 to specify a genre and/or field 1024 to specify a repertory (e.g., sub-category) associated with a genre selected from field 1024 of the content item. Further, GUI 1020 further includes a tag field 1025 to allow a user to enter one or more tags for searching purposes. If the user cannot find a category in fields 1023 and 1024, GUI 1020 further includes field 1026 to allow a user to suggest a new category for publishing.

Figure 10C:
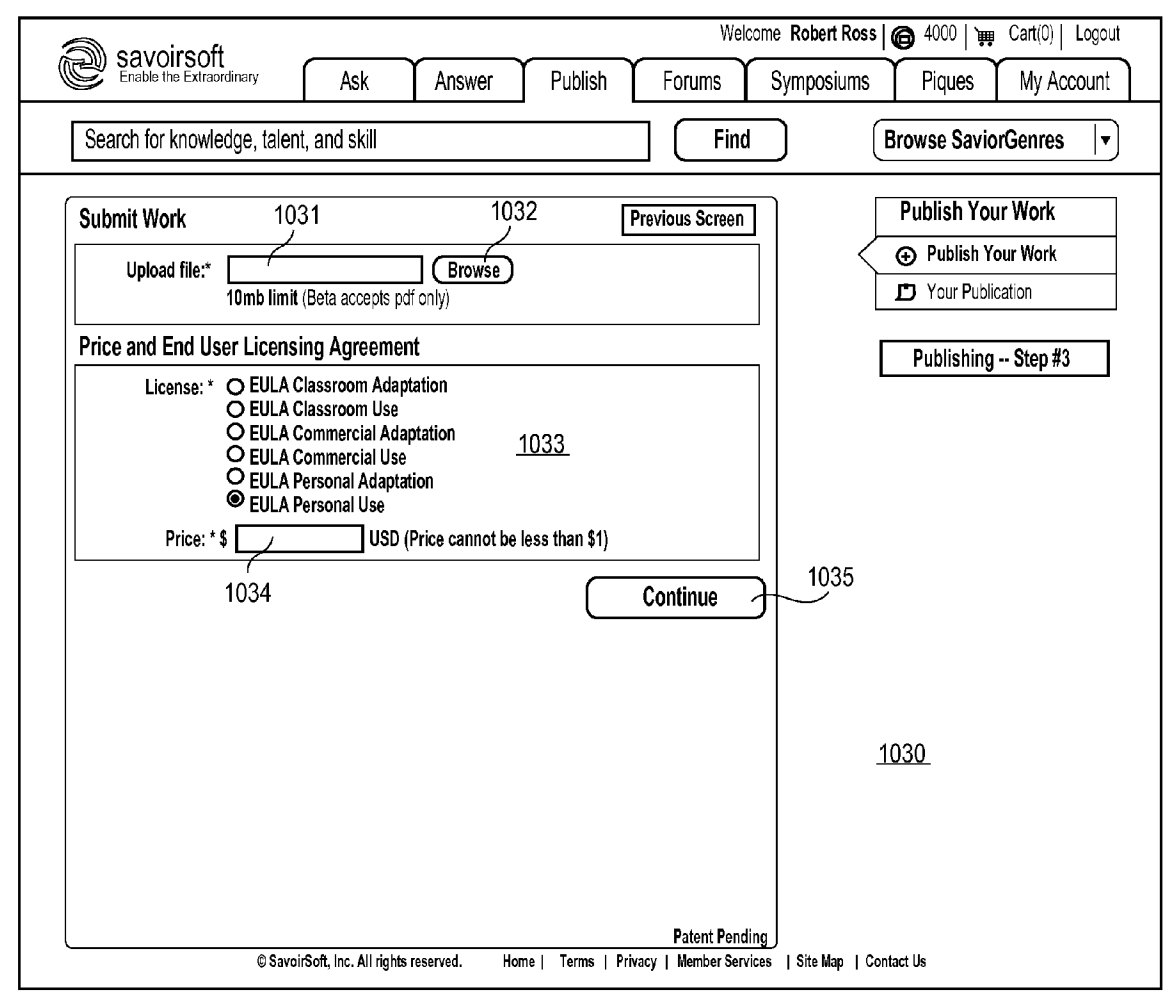

Referring to FIG. 10C, GUI 1030 may be displayed in response to an activation of button 1027 of FIG. 10B. According to one embodiment, GUI 1030 includes field 1031 to allow a user to specify a content file containing the content item to be published. The user can also browse and attach the file via browse button 1032. In addition, GUI 1030 includes field 1033 to display one or more license agreements to be selected for licensing the content item specified in field 1031. In one embodiment, GUI 1030 is used to associate one license at a time with a content item. However, it will be appreciated that GUI 1030 may also be modified or extended to allow a user to select multiple licenses to be associated with the content item. As described above, a single content item may be associated with multiple licenses, each corresponding to a unique content ID.

Further, GUI 1030 includes field 1034 to allow a user to specify a license fee for licensing the content item specified in field 1031 with a license selected from field 1033. It will be appreciated that GUI 1030 may also be modified or extended to allow a user to specify additional information associated with the publication of the content item. For example, a user may also specify additional constraints of the content item being used, such as, for example, minimum ages of users for licensing, types or capabilities of devices for rendering, communications mechanisms or protocols used for delivery, or geographical locations in which the content item being used, etc. Also note that GUI 1030 provides a set of standard license agreements prepared by the system for selection. It will be appreciated that GUI 1030 may also be modified or extended to allow a user to provide or upload a specific or customized license agreement (e.g., prepared by the user or a third party) to be associated with the content item. Alternatively, GUI 1030 may be modified or extended to provide a template to the user to dynamically edit and create a customized license agreement.

Referring now to FIG. 10D, GUI 1040 may be displayed in response to an activation of button 1035 of FIG. 10C. GUI 1040 provides an estimate of cost and revenue sharing information for the content item to be published. In one embodiment, GUI 1040 includes information 1041 indicating the type of the associated license agreement, license fee 1042 which is specified by the user via field 1034 of FIG. 10C, estimated publication fee 1043 which represents the cost or revenue sharing for other entities, and estimated royalties 1044 for the user as a content owner. The fees 1043-1044 may be calculated based on a variety of factors and considerations. For instance, estimated publication fees 1043 may include credit card processing fees, taxes, and other assessments; and estimated royalties 1044 may be the difference between the license fee 1042 and the estimated publication fees 1043. In addition, GUI 1040 further includes information concerning the royalty payment schedule 1045 and minimum number of tokens requested. Tokens 1046 may be requested by the content owner as gratuity for the content item. In order to complete the publication of the content item, the user has to accept the fee schedule displayed by expressly activating acceptance button 1047 and thereafter, posting the content item by activating posting button 1048. Once a content item has been posted, any member can browse and license the content item using techniques as described above. Note that GUIs as shown in FIGS. 10A-10D are described for illustration purposes only; other formats or layouts of the GUIs may also be applied.

FIG. 11 is a flow diagram illustrating a method for licensing a digital rights content item according to one embodiment of the invention. Note that method 1100 may be performed by processing logic which may include software, firmware, hardware, or a combination thereof. For example, method 1100 may be performed by system 200 of FIG. 2. Referring to FIG. 11, at block 1101, a request is received from a user (e.g., subscriber or licensee) to license a digital rights content item published by another user (e.g., author or content owner). At block 1102, one or more license agreements associated with the content item are identified and presented to the user, where the license agreements are selected by the content owner when the content item was published. At block 1103, a signal is received indicating that the user has selected a license agreement and has accepted some or all terms of the license agreement. In response to the signal, at block 1104, a tracking code or ID is generated based in part on a content ID associated with the content item and the accepted license agreement, in conjunction with a user ID of the user. At block 1105, a deliverable content file containing the content item is generated by inscribing or embedding the tracking code in the deliverable content file, for example, in a visible form (e.g., watermark or printed in a footnote) or audible form. Thereafter, at block 1106, the deliverable file is transmitted to the user for licensed usage.

Figure 12A:
FIGS. 12A-12B screenshots illustrating graphical user interfaces for licensing a digital rights content item according to certain embodiments of the invention.
Figure 12B:
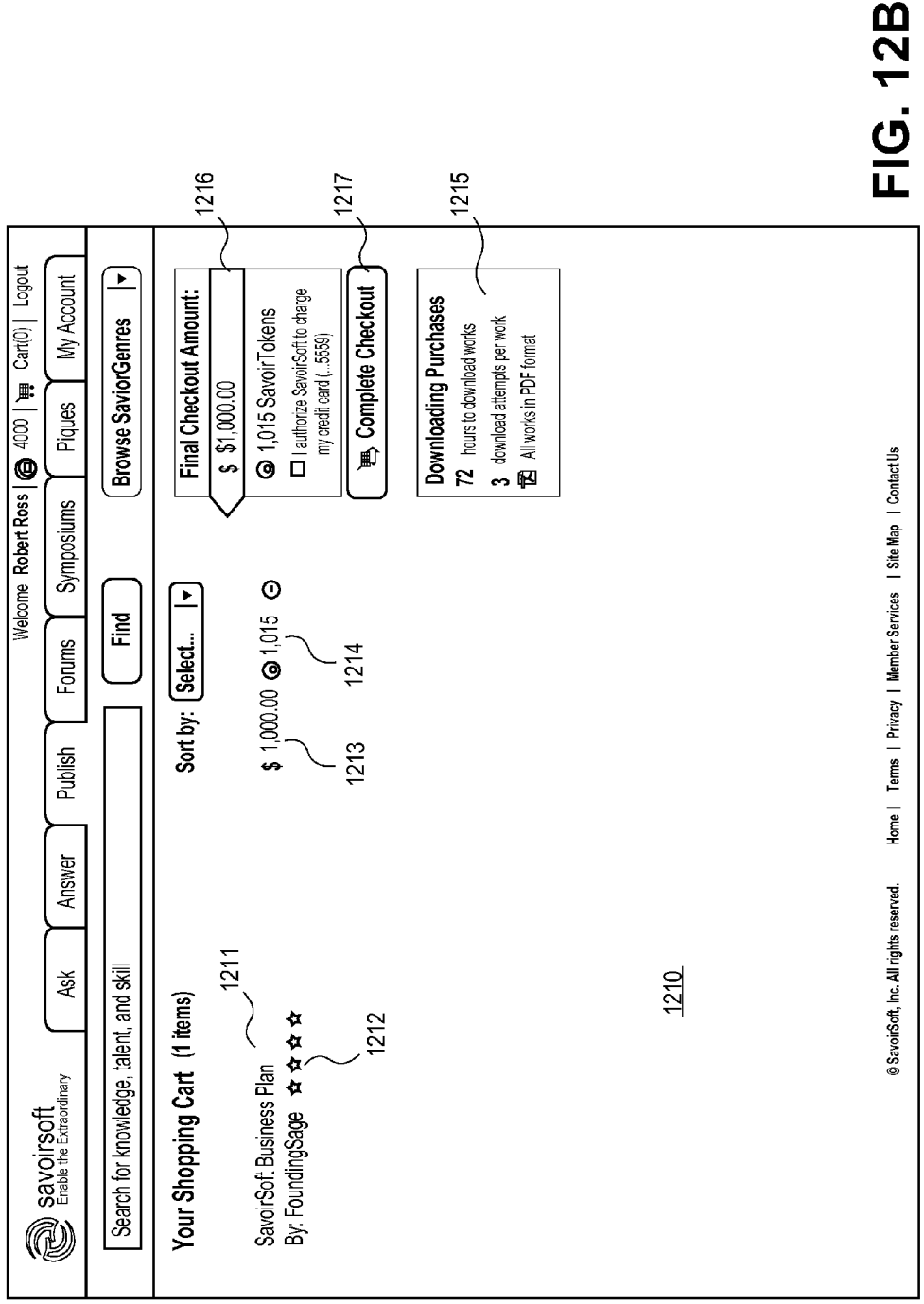

FIGS. 12A-12B are screenshots illustrating GUIs for licensing a digital rights content item according to one embodiment of the invention. Referring to FIG. 12A, GUI 1200 may be displayed by selecting forum tab 1003 of FIG. 10A, where a user can search for content item via search field 1008. A search result can be displayed in GUI 1200 having one or more digital rights content items, each being associated with a license agreement. When a user selects a content item, the associated license agreement is displayed as license 1201. License 1201 includes a general term 1202 and specific terms 1203. Each of these terms has to be expressively accepted by checking the corresponding boxes. Once the user has accepted all of the terms displayed, the user can add the content item to a shopping cart by activating button 1204. In addition, the system may also determine, for example, by examining the corresponding user profile, whether the user can satisfy other requirements set forth by the content owner, such as, for example, minimum age requirement, geographical location, capability of tendering devices, and communication protocols, etc. If any of these requirements is not satisfied, an error message may be displayed and the content item may not be delivered.

The user may also review the content items in the shopping cart via GUI 1210 as shown in FIG. 12B, which may be displayed by activating button 1204 of FIG. 12A. Referring to FIG. 12B, GUI 1210 includes one or more content items that have been added in the shopping cart, in this example, content item 1211. In addition, a rating or ranking 1212 of the content item 1211 may also be provided. Rating or ranking 1212 are the average cumulative ratings or rankings awarded to the content item by other users who have licensed the same content items. For instance, the higher the rating or ranking a content item receives from licensed users, the greater the number of stars awarded. The lower the rating or ranking a content item receives from licensed users, the fewer the number of start awarded. GUI 1210 also includes fee area 1216 to display the total amount of fees required for checkout when activating button 1217. Further, GUI 1210 may further display information regarding how to download the licensed content items at display location 1215. Once the user activates button 1217, the content item or items in the shopping cart are checked out and the required fees are withdrawn from the user's account (e.g., via the AAA module). For each content item checked out, a tracking code is generated and inscribed on the corresponding content item using certain techniques described above, which generates a corresponding deliverable file. The deliverable file or files are then delivered to the user for licensed uses. Note that GUIs as shown in FIGS. 12A-12B are described for illustration purposes only; other formats or layouts of the GUIs may also be applied. Other information may also be displayed.

Figure 13:
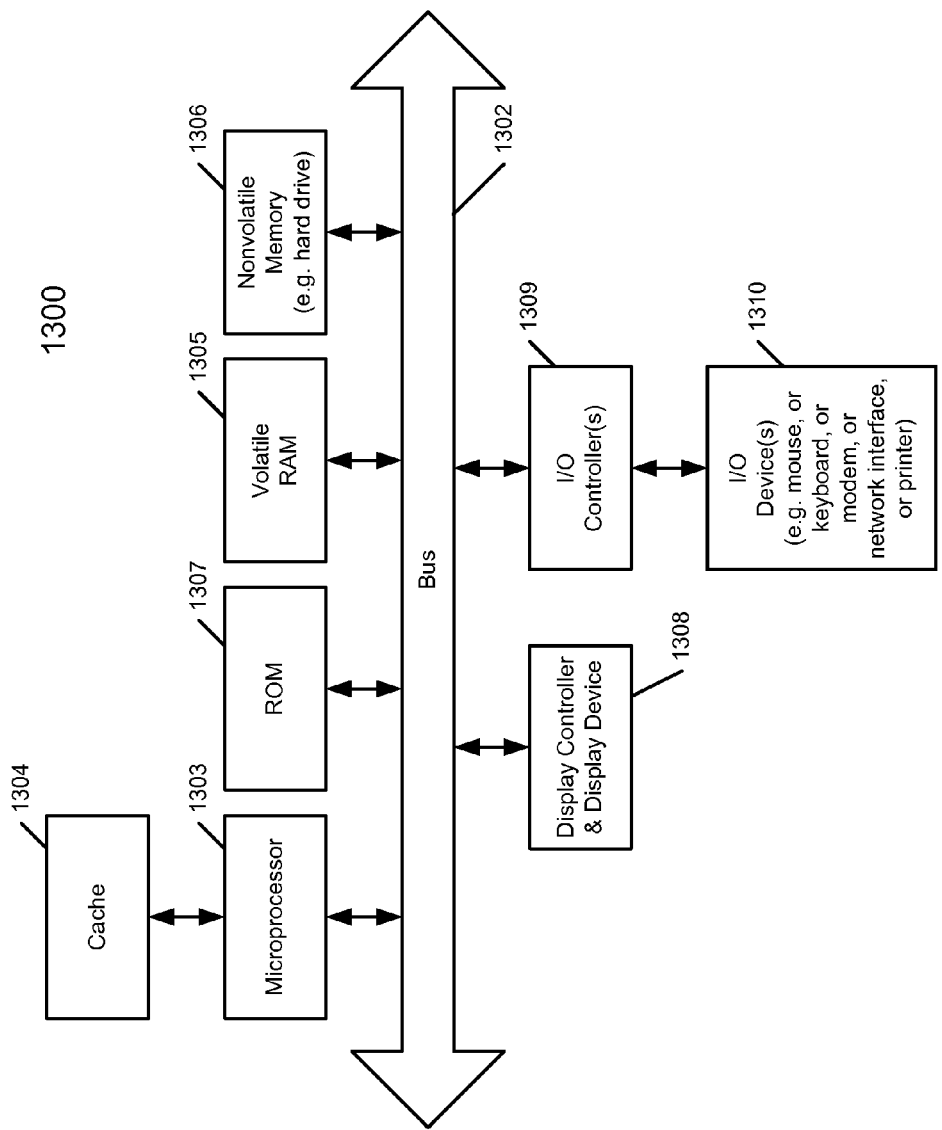
FIG. 13 is a block diagram of a data processing system, which may be used with one embodiment of the invention.

FIG. 13 is a block diagram of a data processing system, which may be used with one embodiment of the invention. For example, the system 1300 may be implemented as system 200 of FIG. 2. Note that while FIG. 13 illustrates various components of a computer system, it is not intended to represent any particular architecture or manner of interconnecting the components; as such details are not germane to the present invention. It will also be appreciated that network computers, handheld computers, cell phones and other data processing systems which have fewer components or perhaps more components may also be used with the present invention. The computer system of FIG. 13 may, for example, be an Apple Macintosh computer or MacBook, or an IBM compatible PC.

As shown in FIG. 13, the computer system 1300, which is a form of a data processing system, includes a bus or interconnect 1302 which is coupled to one or more microprocessors 1303 and a ROM 1307, a volatile RAM 1305, and a non-volatile memory 1306. The microprocessor 1303 is coupled to cache memory 1304. The bus 1302 interconnects these various components together and also interconnects these components 1303, 1307, 1305, and 1306 to a display controller and display device 1308, as well as to input/output (I/O) devices 1310, which may be mice, keyboards, modems, network interfaces, printers, and other devices which are well-known in the art.

Typically, the input/output devices 1310 are coupled to the system through input/output controllers 1309. The volatile RAM 1305 is typically implemented as dynamic RAM (DRAM) which requires power continuously in order to refresh or maintain the data in the memory. The non-volatile memory 1306 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 13 shows that the non-volatile memory is a local device coupled directly to the rest of the components in the data processing system, the present invention may utilize a non-volatile memory which is remote from the system; such as, a network storage device which is coupled to the data processing system through a network interface such as a modem or Ethernet interface. The bus 1302 may include one or more buses connected to each other through various bridges, controllers, and/or adapters, as is well-known in the art. In one embodiment, the I/O controller 1309 includes a USB (Universal Serial Bus) adapter for controlling USB peripherals. Alternatively, I/O controller 1309 may include an IEEE-1394 adapter, also known as FireWire adapter, for controlling FireWire devices.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method performed within a data processing system for processing a digital content item, the method comprising:

registering a first user, content belong to the first user, personal information of the first user and a license comprising license terms for the content by a server side system;

selecting by a cipher key and a cipher method by the server side system and generating by a cipher unit of the server side system a first user ID by applying the cipher key and the cipher method to the user personal information;

generating by the cipher unit a content ID by applying the cipher key and the cipher method to at least the first user ID and a license ID of the license;

receiving by the server side system using the content ID a request for the content from a second user;

receiving, by the server side system, an acceptance of the license by the second user;

generating a tracking code by the server side system by applying the cipher method and the cipher key to at least the content ID, an ID of the second user and a date and time the second user accepted the license and license terms;

creating by the server side system deliverable content by inscribing the tracking code into the content and transmitting the deliverable content to the second user.

2. The method of claim 1, wherein the tracking code is inscribed as at least one of a visible watermark and a footprint of the deliverable content.

3. The method of claim 2, wherein the tracking code identifies the second user in plain text, including at least a name of the second user.

4. The method of claim 1, further comprising:

in response to a selection of the content by the second user, displaying the license associated with the selected content, the license including one or more access terms; and for each access term of the license agreement, displaying a checkbox to allow the second user to individually select the associated access term, wherein the tracking code is generated only when all of the access terms of the displayed license agreement have been individually selected.

5. The method of claim 1, further comprising:

in response to a search request received from the second user, the search request having one or more search terms, performing a search in a content database based on the one or more search terms, the content database storing a plurality of digital content items provided by a plurality of content providers; and presenting a list of one or more digital content items based on a search result of the content database, each of the digital content items being associated with a license agreement, wherein the selected digital content item is selected from the list by the second user.

6. The method of claim 5, wherein each of the digital content items stored in the content database is associated with a license agreement selected by a content provider of the digital content item, wherein each of the digital content items is identified by a content ID that is generated based on a user ID of the content provider, a license ID of the associated license agreement, and one or more attributes extracted from the associated digital content item.

7. The method of claim 1, further comprising:
receiving a second digital content item from a third user, the third user being identified by a third user ID;
presenting to the third user one or more license agreements, each license agreement being identified by a license ID;
in response to a selection of a second license agreement from the license agreements by the third user, generating a second content ID based on the third user ID and a second license ID associated with the second license agreement; and
storing the second digital content item in a storage, wherein the second digital content item is associated with and identified by the second content ID, wherein the second digital content item can be browsed and licensed subsequently by another user based on the second content ID.

8. The method of claim 7, wherein generating the second content ID comprises ciphering the third user ID, the second license ID, and one or more attributes extracted from the second digital content item, using a third cipher key and a third cipher method.

9. The method of claim 7, further comprising:
displaying a first field to receive a title of the second digital content item from the third user;
displaying a second field to receive a brief description about the second digital content item; and
displaying a third field to receive a content category selected from a plurality of categories to be associated with the second digital content item, including displaying a fourth field for selecting one of a plurality of genres and displaying a fifth field for selecting one of a plurality of repertories associated with the selected genre from the fourth field.

10. The method of claim 9, further comprising:
displaying a sixth field for selecting a license agreement from the one or more license agreements; and
displaying a seventh field to receive a license fee specified by the third user for licensing the second digital content item based on the selected license agreement selected from the sixth field.

11. The method of claim 10, further comprising:
in response to the license fee entered at the seventh field, estimating according to a predetermined algorithm royalty allocated from the license fee to be distributed to the third user when the second digital content item is licensed; and
displaying the estimated royalty and a royalty payment schedule.

12. A non-transitory computer-readable medium comprising executable instructions that when executed by a processor causes the processor to perform the steps of:
registering a first user, content belong to the first user, personal information of the first user and a license comprising license terms for the content by a server side system;
selecting by a cipher key and a cipher method by the server side system and generating by a cipher unit of the server side system a first user ID by applying the cipher key and the cipher method to the user personal information;
generating by the cipher unit a content ID by applying the cipher key and the cipher method to at least the first user ID and a license ID of the license;
receiving by the server side system using the content ID a request for the content from a second user;
receiving, by the server side system, an acceptance of the license by the second user;
generating a tracking code by the server side system by applying the cipher method and the cipher key to at least the content ID, an ID of the second user and a date and time the second user accepted the license and license terms;
creating by the server side system deliverable content by inscribing the tracking code into the content and transmitting the deliverable content to the second user.

13. The computer-readable storage medium of claim 12, wherein the tracking code is inscribed as at least one of a visible watermark and a footprint of the deliverable content.

14. A system, comprising:
a processor; and
a non-transitory computer readable medium comprising executable instructions, that when executed by the processor causes the processor to perform the steps of:
registering a first user, content belong to the first user, personal information of the first user and a license comprising license terms for the content by a server side system;
selecting by a cipher key and a cipher method by the server side system and generating by a cipher unit of the server side system a first user ID by applying the cipher key and the cipher method to the user personal information;
generating by the cipher unit a content ID by applying the cipher key and the cipher method to at least the first user ID and a license ID of the license;
receiving by the server side system using the content ID a request for the content from a second user;
receiving, by the server side system, an acceptance of the license by the second user;
generating a tracking code by the server side system by applying the cipher method and the cipher key to at least the content ID, an ID of the second user and a date and time the second user accepted the license and license terms;
creating by the server side system deliverable content by inscribing the tracking code into the content and transmitting the deliverable content to the second user.

15. The system of claim 14, wherein the tracking code is inscribed as at least one of a visible watermark and a footprint of the deliverable content.

* * * * *